C. BARLOW.
Stump-Extractor.

No. 197,238. Patented Nov. 20, 1877.

WITNESSES:
E. Wolff
J H Scarborough

INVENTOR:
C. Barlow
BY Munn & Co
ATTORNEYS.

UNITED STATES PATENT OFFICE.

CORNELIUS BARLOW, OF SHARPSVILLE, INDIANA.

IMPROVEMENT IN STUMP-EXTRACTORS.

Specification forming part of Letters Patent No. 197,238, dated November 20, 1877; application filed October 6, 1877.

*To all whom it may concern:*

Figure 1:
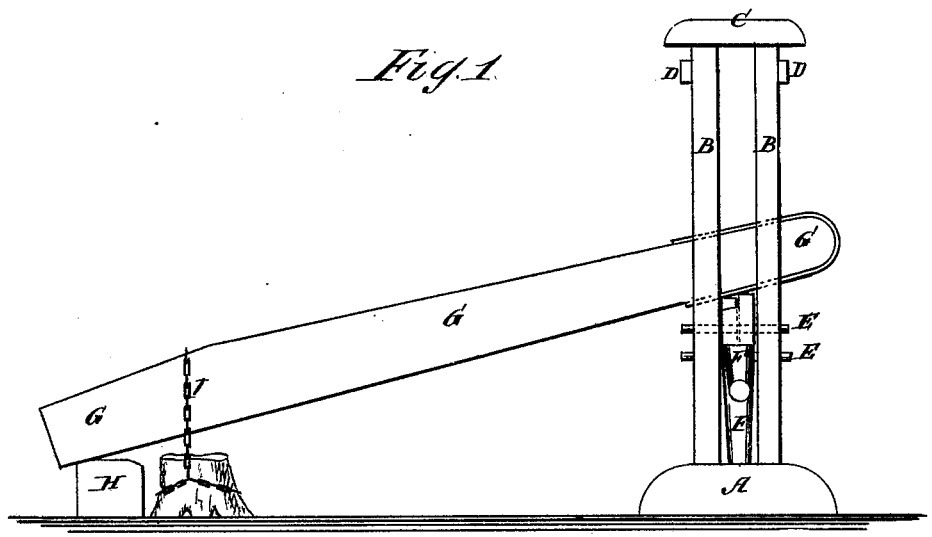
Figure 2:
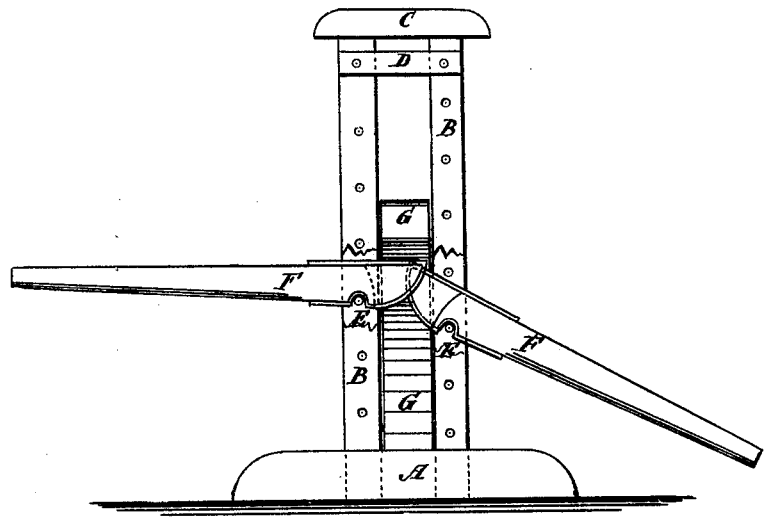

Be it known that I, CORNELIUS BARLOW, of Sharpsville, in the county of Tipton and State of Indiana, have invented a new and useful Improvement in Stump-Puller, of which the following is a specification:

Figure 1 is a side view of my improved machine, and Fig. 2 a front view of the same, part being broken away to show the construction.

Similar letters of reference indicate corresponding parts.

The object of this invention is to furnish an improved machine for pulling stumps and roots, for raising buildings and other heavy objects, and which shall be simple in construction, convenient in use, powerful in operation, easily operated, and inexpensive in manufacture.

The invention will first be described in connection with the drawing, and then pointed out in the claim.

A is a base-block, to which are attached the lower ends of four posts, B, and which is made of such size as to give the said posts a substantial support.

The upper ends of the posts B are attached to a cap-block, C, and the upper ends of the front and rear pairs are further strengthened by cross-bars D attached to their outer sides.

In the side pairs of the posts B are formed series of holes to receive the iron pins E, which serve as fulcrums to the levers F. The levers F are inserted from the opposite sides, their inner ends are halved so as to pass each other, are faced with metal, and are notched upon the lower side to rest upon the pins E, which serve as fulcrums for them.

G is the lifting-lever, the end of which is passed between the post B, rests upon the inner ends of the levers F, and is faced with iron to prevent wear. The other end of the lever G is attached to or rests upon a fulcrum-block, H, which is made sufficiently large to prevent it from being pressed into the ground.

To the lever G, at a little distance from the fulcrum-block H, is attached a chain, I, which is passed around the lever G, and around the stump or root to be drawn.

For raising buildings, &c., the end part of the lever is passed beneath the sill of the building.

The machine is operated by working the levers F alternately, and raising the fulcrum-pins E alternately to higher holes in the posts B.

Having thus described my invention, I claim as new and desire to secure by Letters Patent—

In a stump-puller, the combination, with a lifting-lever, G, of the levers F F, provided with detachable fulcrum-pins E, and the four perforated posts B, the levers F being fulcrumed under and resting against the bottom of the lifting-lever, as shown and described, so as to dispense with hooks and chains and the labor of hooking and unhooking them.

CORNELIUS BARLOW.

Witnesses:
GEORGE C. WOOD,
RUFUS D. COUCH.